United States Patent
Ayres et al.

(10) Patent No.: US 9,388,711 B2
(45) Date of Patent: Jul. 12, 2016

(54) CRYOGENIC ENGINE SYSTEM

(71) Applicant: Dearman Engine Company Ltd, London (GB)

(72) Inventors: Michael Ayres, London (GB); Henry Clarke, London (GB); Peter Dearman, Herts (GB); Dongsheng Wen, London (GB)

(73) Assignee: Dearman Engine Company Ltd., London (GB)

( * ) Notice: Subject to any disclaimer, the term of this patent is extended or adjusted under 35 U.S.C. 154(b) by 236 days.

(21) Appl. No.: 14/367,677

(22) PCT Filed: Dec. 20, 2012

(86) PCT No.: PCT/GB2012/053220
§ 371 (c)(1),
(2) Date: Jun. 20, 2014

(87) PCT Pub. No.: WO2013/093486
PCT Pub. Date: Jun. 27, 2013

(65) Prior Publication Data
US 2015/0226093 A1 Aug. 13, 2015

(30) Foreign Application Priority Data

Dec. 22, 2011 (GB) .................................. 1122191.8

(51) Int. Cl.
*F01K 25/06* (2006.01)
*F01K 25/10* (2006.01)
(Continued)

(52) U.S. Cl.
CPC ................. *F01K 25/06* (2013.01); *F01K 25/10* (2013.01); *F02M 21/0287* (2013.01); *F02M 21/06* (2013.01); *Y02T 10/32* (2013.01)

(58) Field of Classification Search
CPC ........ F01K 25/06; F01K 25/10; F02M 21/06; F02M 21/0287; Y02T 10/32
USPC ..................... 60/649, 651, 671, 673
See application file for complete search history.

(56) References Cited

U.S. PATENT DOCUMENTS

| 3,570,261 A | 3/1971 | Schwartzman |
| 3,692,459 A * | 9/1972 | Erb ........................ F01K 25/005 431/11 |

(Continued)

FOREIGN PATENT DOCUMENTS

| CN | 2553129 Y | 5/2003 |
| CN | 1732338 A | 2/2006 |

(Continued)

OTHER PUBLICATIONS

International Search Report and Written Opinion of the International Searching Authority (17 pages) Date of Completion Jun. 24, 2013.

(Continued)

*Primary Examiner* — Hoang Nguyen
(74) *Attorney, Agent, or Firm* — Thomas B. Ryan; Harter Secrest & Emery LLP

(57) ABSTRACT

A cryogenic engine system and method for delivering cryogen to a cryogenic engine are provided. The cryogenic engine system comprises a tank for storing liquid cryogen, a cryogenic engine, a pump configured to pressurize cryogen from the tank, a first conduit for transporting cryogen between the pump and the cryogenic engine, a second conduit for transporting cryogen from the pump back to the tank, and a first valve disposed in the second conduit for controlling the flow of cryogen from the pump back to the tank. A pre-mixing system for a cryogenic engine and a method for mixing cryogen with a heat exchange fluid (HEF) are also provided.

20 Claims, 2 Drawing Sheets

(51) Int. Cl.
*F02M 21/02* (2006.01)
*F02M 21/06* (2006.01)

(56) References Cited

U.S. PATENT DOCUMENTS

| | | | |
|---|---|---|---|
| 3,710,770 A | 1/1973 | Newkirk et al. | |
| 4,178,761 A | 12/1979 | Schwartzman | |
| 4,430,971 A | 2/1984 | Holding | |
| 4,430,978 A | 2/1984 | Lewis et al. | |
| 4,893,471 A | 1/1990 | Huling | |
| 6,205,981 B1 | 3/2001 | Lorraine | |
| 7,047,744 B1 | 5/2006 | Robertson et al. | |
| 8,959,887 B2 * | 2/2015 | Allam | F23D 1/00 60/39.5 |
| 2003/0136126 A1 | 7/2003 | Dearman | |
| 2007/0051089 A1 | 3/2007 | Lewis | |
| 2007/0163261 A1 | 7/2007 | Strathman | |
| 2008/0271455 A1 | 11/2008 | Karpf | |
| 2008/0276627 A1 | 11/2008 | Lee et al. | |
| 2009/0320786 A1 | 12/2009 | Fisher | |
| 2010/0077753 A1 | 4/2010 | De Reyes | |
| 2010/0242921 A1 | 9/2010 | Harper | |
| 2011/0179799 A1 * | 7/2011 | Allam | F23M 5/085 60/772 |

FOREIGN PATENT DOCUMENTS

| | | | |
|---|---|---|---|
| CN | 2791285 | Y | 6/2006 |
| CN | 1847636 | A | 10/2006 |
| CN | 101265859 | A | 9/2008 |
| CN | 101382099 | A | 3/2009 |
| CN | 201407075 | Y | 2/2010 |
| DE | 19524171 | A1 | 1/1997 |
| DE | 10040679 | A1 | 2/2002 |
| DE | 102006061251 | A1 | 7/2008 |
| FR | 2188094 | A1 | 1/1974 |
| FR | 2814530 | A1 | 3/2002 |
| FR | 2920484 | A1 | 3/2009 |

OTHER PUBLICATIONS

Chinese Application No. 2012800637131, English translation of Office Action dated May 6, 2015.
Chinese Application No. 2012800637131, English translation of First Search Report dated Apr. 14, 2015 in the EPO Global Dossier.
International Preliminary Examination Report with Annexes for PCT/GB2012/053220 dated Mar. 18, 2014.

* cited by examiner

CRYOGENIC ENGINE SYSTEM

FIELD OF THE INVENTION

The present invention relates to a cryogenic engine system using liquid cryogenic fuel.

BACKGROUND OF THE INVENTION

It is known to use liquid cryogenic fuel in engines and to pre-pressurise the cryogen before injection into the engine. The present invention is a development of the cryogenic engine system described in U.S. Pat. No. 6,983,598 B2. A cryogenic engine is an engine which is driven by the expansion of a cryogenic fuel.

In existing systems, such as that described in U.S. Pat. No. 6,983,598 B2, problems have arisen in delivering low quality (near fully liquid phase) cryogen to the engine due to boil off caused by heat transfer from the surroundings into the feed lines. For subcritical feed pressures, this manifests itself as a significant increase in specific volume of the fluid.

Other issues which have been identified in existing systems include:

- a reduction in tank pressure as liquid cryogen is removed; the reduction in tank pressure reduces the feed pressure to the inlet of the cryogenic pumping or injection system, potentially reducing flow rates. This issue needs to be addressed to allow continuous running of the engine, otherwise tank pressure may reduce to a point where cavitation at the pump inlet prevents sufficient liquid flow being delivered to the engine for the desired power output. It is also possible that cavitation could damage pumping equipment;
- reducing the pressure under which a cryogenic liquid is stored may also cause unwanted boiling of the liquid. Increased flow rates reduce the unwanted boiling of liquid nitrogen between the tank and the pump, and between the pump and the engine;
- flow pulsations in the feed line caused by the cyclic operation of the cryogenic pump and injection valves. Pulsations caused by valve inlets may interact with those caused by the pump, may be amplified by cavitation, and ultimately may affect flow rates into the engine, causing unsteady engine operation;
- difficulty in introducing cryogen and heat exchange fluid (HEF) during the short time frame prescribed by the engine operating speed, which can impact the efficiency of operation of the engine; and
- the limited period of time in which heat exchange can take place between the cryogen and the HEF, which, again, can impact the efficiency of operation of the engine.

US 2008/0271455 A1 relates to a heat exchange subsystem of a continuous flow cryogenic engine system intended to circumvent the problem experienced in conventional cryogenic engines of icing up from moisture found in ambient air, which can decrease the efficiency of the heat exchangers in their function. Heat is generated by burning hydrocarbon based fuel (e.g. propane). By mixing the heated air and combustion products with liquid cryogenic fuel inside a chamber, the subsystem delivers a continuous flow of high pressure gas at near ambient temperature which can be used in a connected expansion device to extract work. However, the gaseous oxygen required for combustion is provided by the vaporisation of the cryogen within the combustion chamber, but no consideration is given to the flash point of the combustible fuel which dictates whether the fuel will ignite. Moreover, the reduction in temperature and consequent contraction of the combustible gases due to vaporisation and heating of the cryogen mitigate the expansion of the cryogen and, therefore, the build-up of pressure.

Therefore, there is a need for an improved cryogenic engine system which overcomes these issues.

SUMMARY OF THE INVENTION

The cryogenic engine system of the present invention is designed to overcome the problems identified above.

In view of the foregoing and in accordance with a first aspect of the invention, there is provided a cryogenic engine system, comprising:
- a tank for storing liquid cryogen;
- a cryogenic engine;
- a pump configured to pressurise cryogen from the tank;
- a first conduit for transporting cryogen between the pump and the cryogenic engine;
- a second conduit for transporting cryogen from the pump back to the tank; and
- a first valve disposed in the second conduit for controlling the flow of cryogen from the pump back to the tank.

The present invention also provides a method for delivering cryogen to a cryogenic engine, comprising:
- providing a tank for storing liquid cryogen;
- providing a cryogenic engine;
- providing a pump for pressurising cryogen from the tank;
- transporting cryogen from the pump to the cryogenic engine via a first conduit;
- transporting cryogen from the pump back to the tank via a second conduit; and
- providing a first valve disposed in the second conduit for controlling the flow of cryogen from the pump back to the tank.

Hence, cryogen not transported to the cryogenic engine can be returned to the tank via the second conduit in a gaseous state or in a multi-phase state. Returning cryogen to the tank in a gaseous state can maintain tank pressure. Returning cryogen to the tank in a multi-phase state can maintain the flow rate to the cryogenic engine, which may be via pre-mixers for mixing the cryogen with a heat exchange fluid, while ensuring rapid delivery such that a low thermodynamic quality (minimal vapour fraction) cryogen is delivered to the engine or pre-mixers.

The second conduit may include a first channel and a second channel arranged in parallel along at least a portion of the length of the second conduit, wherein the first valve is disposed in the first channel, or in the second channel. In context of the present invention, the term "parallel" does not have its strict geometric meaning. Rather, the term "parallel" is used to signify that the second conduit separates into the first and second channels along at least a portion of its length i.e. analogous to the definition of the term "parallel" in electronics.

The system may further comprise a second valve disposed in the other of the first channel and second channel, wherein the first and second valves are independently controllable.

When the first valve is disposed in the first channel and the second valve is disposed in the second channel, when the second valve is closed, gaseous cryogen trapped in the second channel acts as a flow damper, reducing pulsations in the cryogen flow caused by the cyclic operation of the pump and valves.

The first channel may be insulated to reduce heat transfer from the atmosphere.

The second channel may be uninsulated to encourage heat transfer from the atmosphere. The second channel may be longer than the first channel. The second channel may have a serpentine configuration. Consequently, the second channel may form a heating loop.

The first conduit may be insulated to reduce heat transfer from the atmosphere.

The first and second valves may, independently or jointly, be controllable on a continuous scale using a control input.

The control input may comprise at least one of a solenoid actuator, a pneumatic actuator, a hydraulic actuator, a mechanical actuator and an electric actuator.

The control input may use a control algorithm.

The system may further comprise a regulator for regulating the pressure of the gas/liquid returning to the tank, and for preventing very high velocity re-introduction of gas/liquid into the tank.

The method may further comprise providing a regulator.

The regulator may be disposed in the second conduit at a position between a) the first and second valves and b) the tank.

The system may further comprise at least one pre-mixing chamber disposed in the first conduit between the pump and the cryogenic engine. The pre-mixing chamber may be for mixing the cryogen with a heat exchange fluid.

The method may further comprise providing at least one pre-mixing chamber disposed in the first conduit between the pump and the cryogenic engine. The pre-mixing chamber may be for mixing the cryogen with a heat exchange fluid.

According to a second aspect of the invention, there is provided a pre-mixing system for a cryogenic engine, comprising:
  a source of working fluid comprising a liquid cryogen;
  a source of heat exchange fluid (HEF);
  at least one pre-mixing chamber having:
    a first inlet configured to inject the working fluid into the at least one pre-mixing chamber;
    a second inlet configured to inject the HEF into the at least one pre-mixing chamber; and
    at least one outlet configured to inject the working fluid from the at least one pre-mixing chamber into an expansion chamber,
  wherein the at least one pre-mixing chamber, the first inlet and the second inlet are arranged so that the working fluid and the HEF flow in opposite directions within the at least one pre-mixing chamber.

The second aspect of the invention also provides a method for mixing cryogen with a heat exchange fluid (HEF), comprising:
  providing a source of working fluid comprising a liquid cryogen;
  providing a source of HEF;
  providing at least one pre-mixing chamber;
  injecting the working fluid into the at least one pre-mixing chamber via a first inlet;
  injecting HEF into the at least one pre-mixing chamber via a second inlet,
  wherein the at least one pre-mixing chamber, the first inlet and the second inlet are arranged so that the working fluid and the HEF flow in opposite directions within the at least one pre-mixing chamber; and
  injecting the working fluid from the at least one pre-mixing chamber into an expansion chamber via at least one outlet.

This aspect of the invention can, in some instances, be used to maximise the relative velocity of the cryogen and HEF on injection into the pre-mixing chamber, enhancing the break-up induced by Kelvin-Helmholtz instability, and increasing mixing of the cryogen and the HEF.

The at least one outlet may be configured to inject the working fluid and the HEF from the at least one pre-mixing chamber into the expansion chamber.

The at least one pre-mixing chamber may have a first outlet configured to inject the working fluid from the at least one pre-mixing chamber into the expansion chamber and a second outlet configured to eject the HEF from the at least one pre-mixing chamber.

The at least one pre-mixing chamber may be substantially cylindrical. The at least one pre-mixing chamber, the first inlet and the second inlet may be arranged so that one of the working fluid and the HEF flows in a clockwise direction within the at least one pre-mixing chamber, and the other of the working fluid and the HEF flows in an anti-clockwise direction within the at least one pre-mixing chamber.

The system may further comprise a plurality of pre-mixing chambers each having its own respective first inlet, second inlet and at least one outlet.

The method may further comprise providing a plurality of pre-mixing chambers each having its own respective first inlet, second inlet and at least one outlet.

At least one pre-mixing chamber may be mounted on the expansion chamber, and at least one outlet may comprise a rotating valve.

According to a third aspect of the present invention, there is provided a pre-mixing system for a cryogenic engine, comprising:
  a source of working fluid comprising a liquid cryogen;
  a source of heat exchange fluid (HEF); and
  at least one pre-mixing chamber having:
    a plurality of first inlets configured to act in parallel and inject working fluid into the at least one pre-mixing chamber;
    a second inlet configured to inject HEF into the at least one pre-mixing chamber; and
    at least one outlet configured to inject the working fluid from the at least one pre-mixing chamber into an expansion chamber,
  wherein each first inlet comprises a first valve.

The third aspect of the invention also provides a method for mixing cryogen with a heat exchange fluid (HEF), comprising:
  providing a source of working fluid comprising a liquid cryogen;
  providing a source of HEF;
  providing at least one pre-mixing chamber;
  injecting working fluid into the at least one pre-mixing chamber via a plurality of first inlets acting in parallel, wherein each first inlet comprises a first valve;
  injecting HEF into the at least one pre-mixing chamber via a second inlet; and
  injecting the working fluid from the at least one pre-mixing chamber into an expansion chamber via at least one outlet.

Very high pressurisation rates are possible through direct heat transfer processes. Consequently, there is the possibility that the boiling process may raise the pre-mixing chamber pressure above the pressure in the first conduit before injection of cryogen into the pre-mixing chambers has finished in cases where a large mass transfer of cryogen is required. Having multiple inlet valves capable of operating in parallel addresses this issue where the flow rate is constrained by available valve diameters.

In some instances, the groups of multiple valves open simultaneously to admit the flow of cryogen to the premixing chambers at the required rate.

However, the parallel valves in each group may also be operated individually for the purpose of admitting a smaller charge of cryogen to the pre-mixing chamber for cases where lower power outputs are required. Valves can be opened in such a way so as to perform the function of a regulator allowing the remainder of the flow to be returned to the tank during the transient period as the pump speed is reduced.

The at least one outlet may be configured to inject the working fluid and the HEF from the at least one pre-mixing chamber into the expansion chamber.

The at least one pre-mixing chamber may have a first outlet configured to inject the working fluid from the at least one pre-mixing chamber into the expansion chamber and a second outlet configured to eject the HEF from the at least one pre-mixing chamber.

The plurality of first valves may be controllable independently of each other.

The at least one pre-mixing chamber may be substantially cylindrical. The at least one pre-mixing chamber, the plurality of first inlets and the second inlet may be arranged so that one of the working fluid and the HEF flows in a clockwise direction within the at least one pre-mixing chamber, and the other of the working fluid and the HEF flows in an anti-clockwise direction within the at least one pre-mixing chamber.

The system may further comprise a plurality of pre-mixing chambers each having its own respective plurality of first inlets, second inlet and at least one outlet. Corresponding first valves in each of the plurality of first valves of each of the plurality of pre-mixing chambers may be configured to be operated in parallel with one another. Alternatively, corresponding first valves in each of the plurality of first valves of each of the plurality of pre-mixing chambers may be configured to be operated independently of one another.

At least one pre-mixing chamber may be mounted on the expansion chamber, and at least one outlet may comprise a rotating valve.

According to a fourth aspect of the present invention, there is provided a pre-mixing system for a cryogenic engine, comprising:

a source of working fluid comprising a liquid cryogen;
a source of heat exchange fluid (HEF); and
a plurality of pre-mixing chambers arranged in parallel and in fluid communication with an expansion chamber, each pre-mixing chamber having:
a first inlet configured to inject cryogen into its respective pre-mixing chamber;
a second inlet configured to inject HEF into its respective pre-mixing chamber; and
at least one outlet configured to inject the working fluid from its respective pre-mixing chamber into an expansion chamber.

The fourth aspect of the invention also provides a method for mixing cryogen with a heat exchange fluid (HEF), comprising:

providing a source of working fluid comprising a liquid cryogen;
providing a source of HEF;
providing a plurality of pre-mixing chambers arranged in parallel and in fluid communication with an expansion chamber, each pre-mixing chamber having:
a first inlet for injecting cryogen into its respective pre-mixing chamber;
a second inlet for injecting HEF into its respective pre-mixing chamber; and
at least one outlet configured to inject the working fluid from its respective pre-mixing chamber into an expansion chamber More than one pre-mixing chamber can be employed in connection with a single cryogenic engine expansion chamber. As a result, the period of operation for each pre-mixing chamber may be a multiple of the period of the expansion chamber, which could be an engine cylinder (dictated by the engine rpm), allowing greater time for the introduction of fluids and for heat transfer.

The at least one outlet may be configured to inject the working fluid and the HEF from the at least one pre-mixing chamber into the expansion chamber.

The at least one pre-mixing chamber may have a first outlet configured to inject the working fluid from the at least one pre-mixing chamber into the expansion chamber and a second outlet configured to eject the HEF from the at least one pre-mixing chamber.

Each pre-mixing chamber may be substantially cylindrical. Each pre-mixing chamber, first inlet and second inlet may be arranged so that one of the working fluid and the HEF flows in a clockwise direction within the pre-mixing chamber, and the other of the working fluid and the HEF flows in an anti-clockwise direction within the pre-mixing chamber.

Each pre-mixing chamber may comprise a plurality of first inlets.

At least one pre-mixing chamber may be mounted on the expansion chamber, and at least one outlet may comprise a rotating valve.

Each of the first to fourth aspects of the present invention may function independently of one another or in combination with one or more of the other of the first to fourth aspects of the present invention.

BRIEF DESCRIPTION OF THE DRAWINGS

The invention will now be described by way of example with reference to the accompanying drawings, in which.

DETAILED DESCRIPTION OF THE DRAWINGS

Figure 1:
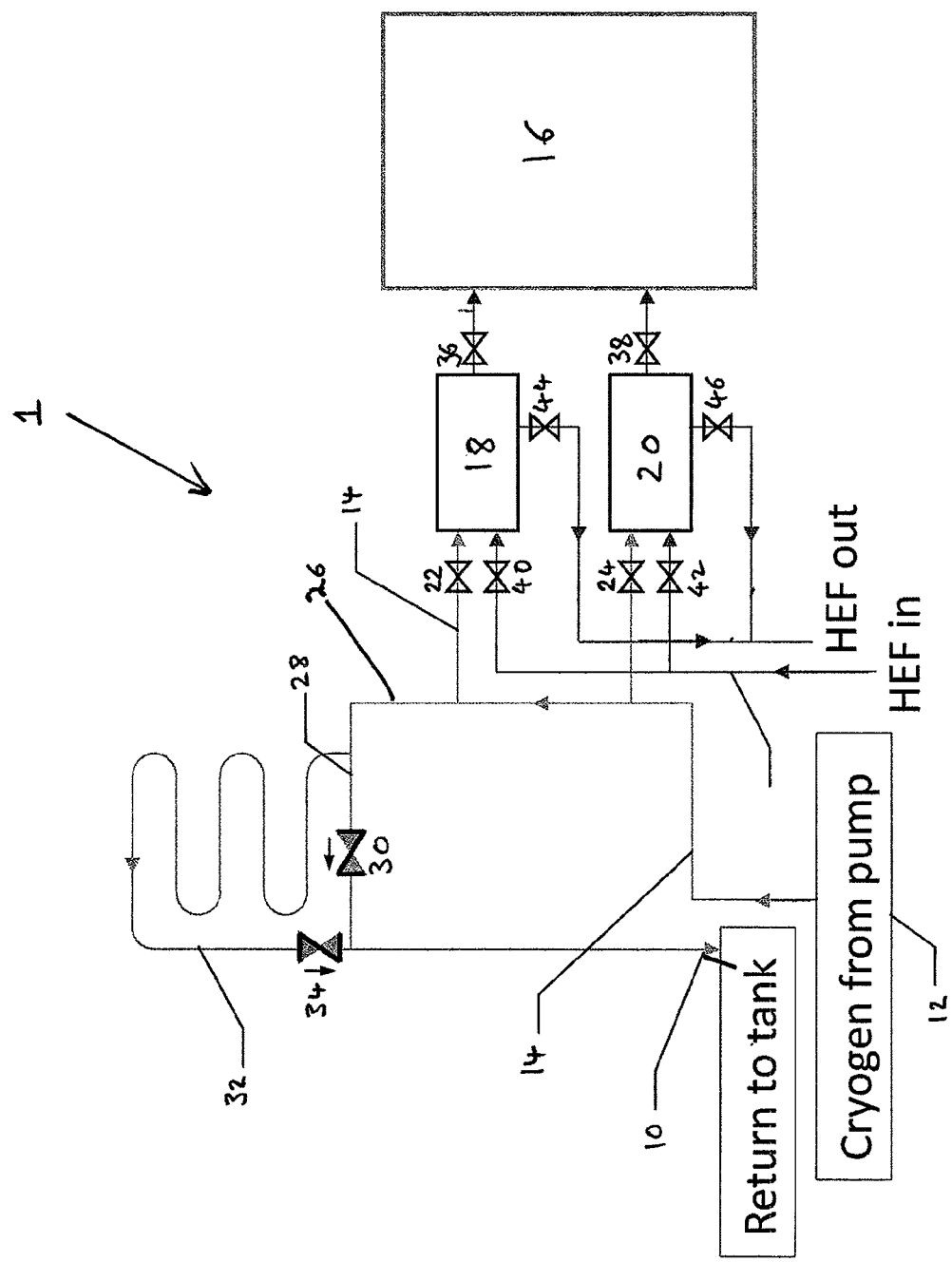
FIG. 1 shows a schematic view of a cryogenic engine system according to an embodiment of the present invention.

FIG. 1 shows a cryogenic engine system 1 according to an embodiment of the present invention.

Liquid cryogen is stored in a suitable storage vessel, such as a tank 10, at high pressure. A typical storage pressure is approximately 3 bar. The cryogen is fed from the tank 10 to a cryogenic pump 12 where it is pressurised and then admitted to a first conduit 14. Typically, the cryogen is pressurised by the pump 12 to a pressure of 150 bar and then admitted to the first conduit 14 at a rate of 25 grams/s.

Before being admitted to a cryogenic engine 16, some or all of the cryogen flow from the pump 12 is directed to at least one pre-mixing chamber 18, 20 through the first conduit 14, which comprises a well-insulated pipe. In the exemplary embodiment shown in FIG. 1, the system comprises two pre-mixing chambers 18, 20. However, any number of pre-mixing chambers 18, 20 can equally be used. In the exemplary embodiment shown in FIG. 1, approximately 10 grams/s of cryogen from the first conduit 14 is diverted to each of the pre-mixing chambers 18, 20 through valves 22 and 24 in a timed manner.

The mass of cryogen introduced to each pre-mixing chamber 18, 20 can be varied through the duration of opening of control valves 22 and 24, or by varying the pressure in the first conduit 14 via control of the cryogenic pump 12, or as a combination of both. It may therefore be convenient to drive the pump 12 directly from a driveshaft (not shown) in the engine 16 or using an electric or hydraulic motor for greater control.

A portion of the cryogen from the pump 12 can be circulated back to the tank 10 via a second conduit 26 which branches from the first conduit 14, as shown in FIG. 1. The second conduit comprises a first channel 28 and a second channel 32 along at least a portion of its length. The first 28 and second 32 channels act in parallel. Of the portion of cryogen which is directed back to the tank 10 (typically 5 grams/s), some can be directed back to the tank 10 directly via the first channel 28 through the opening of a check-control valve 30. This requires a further check-control valve 34 in the second channel 32 to be closed. Valves 30 and 34 can be opened and closed independently of each other on a continuous scale. Typically, with valve 30 partially open and valve 34 closed, the cryogen flowing through the first channel 28 is at a pressure of 150 bar and is subsequently discharged back into the tank 10 at 3 bar in a multiphase state. This maintains the flow rate to the pre-mixing chambers 18, 20, while ensuring rapid delivery such that a low thermodynamic quality (minimal vapour fraction) is achieved.

Alternatively, or in conjunction with this direct return through the first channel 28 and valve 30, cryogen may be directed through the second channel 32, which typically comprises a heating loop consisting of a length of un-insulated pipe, via opening of the check-control valve 34. This portion of the flow is returned to the tank 10 in a fully gaseous phase, and can therefore be used to maintain tank 10 pressure as liquid cryogen is removed from the tank 10.

It is advantageous to maintain tank 10 pressure because some cryogenic pumps require minimum feed pressures to operate and a significant change in tank 10 pressure may alter the boiling point of the cryogenic liquid stored in it.

For example, in the exemplary embodiment depicted in FIG. 1, should the pressure in the tank 10 fall below 3 bar, valve 34 is partially opened, and valve 30 is partially or fully closed such that the summation of flow rates in the first channel 28 and second channel 32 remains at 5 grams/s. The flow in the second channel 34 is mostly in the gaseous phase due to heat transfer from the atmosphere in the second channel 32, resulting in a greater proportion of gaseous cryogen re-entering the tank 10. The result of this is that the tank 10 is re-pressurised to 3 bar more quickly and valve 34 can be returned to the closed position.

In the exemplary embodiment shown in FIG. 1, the nature of valves 30 and 34 can be such that they are opened by a control input (such as, for example, a solenoid actuator, a pneumatic actuator, a hydraulic actuator, a mechanical actuator or an electric actuator), but will close automatically as a check valve should the pressure downstream exceed that upstream. Optionally, a regulator can be positioned downstream ensuring that returned cryogen is at reduced pressure and the tank 10 is not over pressurised. Moreover, as an alternative, the operation of a partially open valve under various circumstances can perform the function of a regulator.

The operation of the valves 30 and 34 is typically determined by a control algorithm. Valve 34 is opened proportional to the difference between measured tank 10 pressure and a pre-determined operating tank 10 pressure. Valve 30 is opened proportional to the difference between the measured cryogen loop flow rate and a pre-determined optimum flow rate. The net result is that valve 34 opens or partially opens if the tank 10 pressure falls too low, and valve 30 opens or partially opens if the flow rate around the feed loop comprising the first 14 and second 26 conduits falls below the point deemed necessary to maintain flow quality.

As an additional advantage, when the valve 34 is closed, the gaseous cryogen trapped therein acts as a flow damper, reducing pulsations in the flow caused by the cyclic operation of the pump 12 and valves 30, 34.

Moreover, under transient operating conditions, the pressure of the cryogen feed loop may be increased through closing partially or completely valves 30 and 34. The consequence of this is to increase the effective flow rate to the pre-mixing chambers 18, 20 during short periods of rapidly increasing load on the engine 16.

Figure 2:
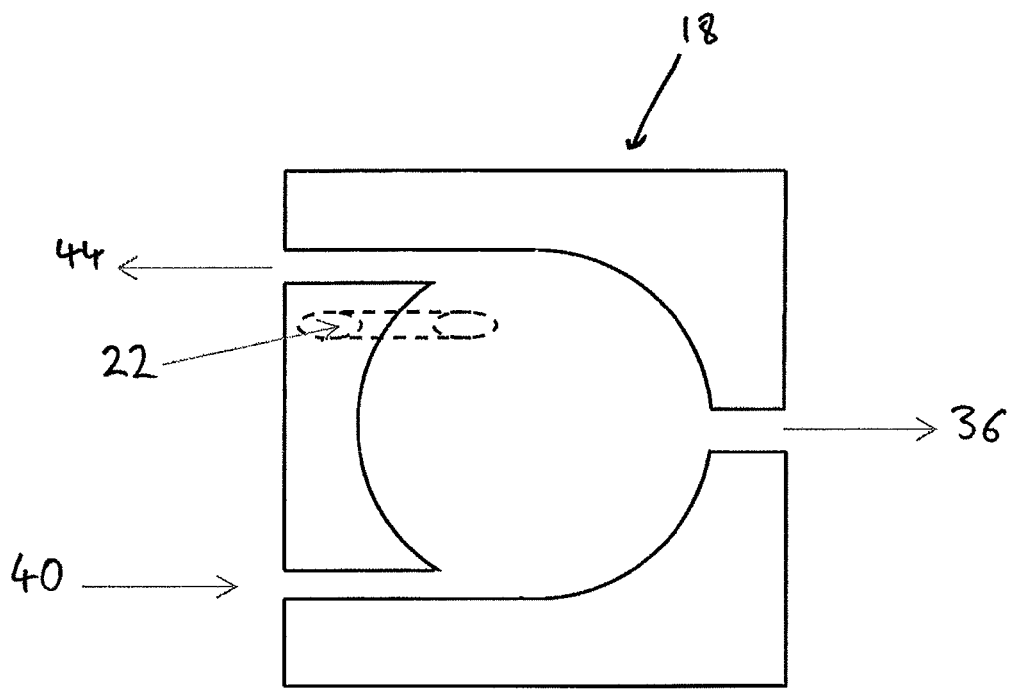
FIG. 2 shows a horizontal plane cutaway view of a pre-mixing chamber of the cryogenic engine system of the embodiment shown in FIG. 1.
Figure 3:
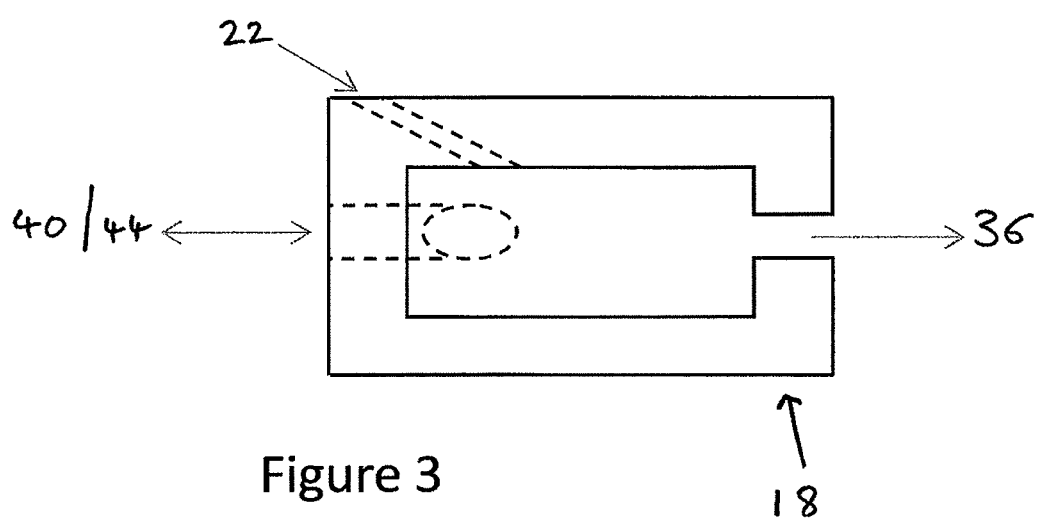
FIG. 3 shows a vertical plane cutaway view of a pre-mixing chamber of the cryogenic engine system of the embodiment shown in FIG. 1.

The operation of the at least one pre-mixing chamber 18, 20 according to an embodiment of the present invention will now be described in detail with particular reference to FIG. 2 and FIG. 3. FIG. 2 shows a horizontal plane cutaway view of a pre-mixing chamber 18 of a cryogenic engine system 1 according to an embodiment of the present invention. FIG. 3 shows a vertical plane cutaway view of a pre-mixing chamber 18 of a cryogenic engine system 1 according to an embodiment of the present invention.

A quantity of heat exchange fluid (HEF) flows into the pre-mixing chamber 18 through an inlet, shown as valve 40 in the FIGS. 2 and 3. Each additional pre-mixing chamber 20 has at least one inlet (e.g. valve 42 in FIG. 1) for injecting HEF into the pre-mixing chamber 20. Prior to admission of cryogen into the pre-mixing chamber 18, 20, the HEF is at a low pressure (about 1 bar) and at the cycle maximum temperature (e.g. ambient, near ambient or above ambient).

Cryogen is injected into the pre-mixing chamber 18 shown in FIGS. 2 and 3 through an inlet depicted as valve 22, generally at the pressure of the first conduit 14 (i.e. 150 bar), and near-fully liquid phase. Again, each additional pre-mixing chamber 20 has at least one inlet for injecting cryogen into the pre-mixing chamber 20 (e.g. valve 24 in FIG. 1).

In the chamber 18, 20, the cryogen is mixed directly with the HEF of low compressibility. Energy transferred from warm HEF heats the cryogen causing a rapid increase in chamber 16, 18 pressure.

The pre-mixing chambers 18, 20 are designed to maximise the mixing between cryogen and HEF by ensuring that the cryogen and the HEF meet whilst they are travelling in substantially opposite directions within a pre-mixing chamber 18, 20. To this end, in the exemplary embodiment depicted in FIGS. 2 and 3, the internal volume of each pre-mixing chamber 18 is generally cylindrical with HEF introduced to maximise swirl in one direction (anti-clockwise as seen in the horizontal-plane cutaway), with the cryogen injected in the opposing direction (clockwise). Alternatively, HEF can travel clockwise whilst cryogen can travel anticlockwise. It will be understood that any technique for maximising mixing between cryogen and HEF could equally be used.

This maximises the relative velocity of the cryogen and HEF on injection, enhancing the break-up induced by Kelvin-Helmholtz instability.

A typical pre-mixing chamber 18, 20 volume is about 20 ml, of which typically approximately 18 ml would be filled with HEF. The injection of approximately 1 to 2 g of cryogenic liquid may produce pre-mixing chamber 18, 20 pressures of up to and exceeding 500 bar.

A high pressure charge of near ambient temperature cryogen gas and HEF is therefore delivered to the cryogenic engine 16 at the appropriate point in the cycle through an outlet, shown in the figures as valve 36. Again, each additional pre-mixing chamber 20 has an outlet for this purpose (e.g. valve 38 in FIG. 1).

In an exemplary embodiment not shown in the figures, the pre-mixing chamber(s) are located as close as possible to the engine. The reason for this configuration is that drops in pressure and/or frictional losses are likely if the mixture of high pressure gas and HEF flows through a channel to the engine. Additionally, these channels would represent "dead volume" into which the gas can expand, wasting work.

It can also be advantageous to mount at least one pre-mixing chamber directly on top of the engine head. A rotating valve (e.g. a spinning disc with an orifice cut into it) can be used to admit the high pressure gas/HEF mixture directly into the engine.

After the boiling process and gas injection, HEF is allowed to flow out of the pre-mixing chamber 18 through a further outlet, shown in the FIGS. 2 and 3 as valve 44. Again, each additional pre-mixing chamber 20 has an outlet for this purpose (e.g. valve 46 in FIG. 1). As the expelled HEF has given up heat for the boiling process, it is at a temperature a few degrees lower than prior to injection into the pre-mixing chamber 18, 20.

Although only a single valve 22, 24 for injection of the cryogen from the feed loop into each pre-mixing chamber 18, 20 is shown in FIGS. 1 to 3, a number of timed control inlets or valves operating in parallel may be used for each chamber 18, 20.

Very high pressurisation rates are possible through direct heat transfer processes. Consequently, it is possible that the boiling process could raise the pre-mixing chamber 18, 20 pressure above the pressure (150 bar) in the first conduit 14 before the injection has finished in cases where a large mass transfer is required. Having multiple inlet valves 22, 24 capable of operating in parallel addresses this issue where the flow rate is constrained by available valve diameters.

In some instances, the groups of multiple valves open simultaneously to admit the flow of cryogen to the pre-mixing chambers 18, 20 at the required rate.

However, the parallel valves in each group may also be operated individually for the purpose of admitting a smaller charge of cryogen (e.g. a flow rate of ~5 g/s to each mixing chamber) to the pre-mixing chamber 18, 20 in cases where lower power outputs are required. In this instance, valve 30 is opened in such a way so as to perform the function of a regulator allowing the remainder of the cryogen flow to be returned to the tank 10 during the transient period as the pump 12 speed is reduced.

In a further embodiment, as shown in FIG. 1, more than one pre-mixing chamber 18, 20, as described above, can be employed in connection with a single cryogenic engine cylinder. As a result, the period of operation for each pre-mixing chamber 18, 20 may be a multiple of the period of the engine 16 cylinder (dictated by the engine rpm), allowing greater time for the introduction of fluids and for heat transfer.

The present invention has been described above in exemplary form with reference to the accompanying drawings which represent a single embodiment of the invention. It will be understood that many different embodiments of the invention exist, and that these embodiments all fall within the scope of the invention as defined by the following claims.

The invention claimed is:

1. A cryogenic engine system, comprising:
a source of working fluid comprising a liquid cryogen;
a source of heat exchange fluid (HEF);
at least one pre-mixing chamber having:
a first inlet configured to inject working fluid into the at least one pre-mixing chamber;
a second inlet configured to inject the HEF into the at least one pre-mixing chamber;
a first outlet configured to inject the working fluid from the at least one pre-mixing chamber into an expansion chamber,
a second outlet configured to allow for the removal of at least a portion of the HEF from the premixing chamber after heat has been removed therefrom, and
wherein the at least one pre-mixing chamber, the first inlet and the second inlet are arranged so that the working fluid and the HEF flow in opposite directions within the at least one pre-mixing chamber.

2. The system of claim 1, wherein the first outlet is configured to inject the working fluid and at least a portion of the HEF from the at least one pre-mixing chamber into the expansion chamber.

3. The system of claim 1, wherein the at least one pre-mixing chamber is substantially cylindrical.

4. The system of claim 1, wherein the at least one pre-mixing chamber, the first inlet and the second inlet are arranged so that one of the working fluid and the HEF flows in a clockwise direction within the at least one pre-mixing chamber, and the other of the working fluid and the HEF flows in an anti-clockwise direction within the at least one pre-mixing chamber.

5. The system of claim 1, further comprising a plurality of pre-mixing chambers each having its own respective first inlet, second inlet and at least one outlet.

6. The system of claim 1, wherein the at least one pre-mixing chamber is mounted on the expansion chamber, and wherein the at least one outlet comprises a rotating valve.

7. A method for mixing cryogen with a heat exchange fluid (HEF), comprising:
providing a source of working fluid comprising a liquid cryogen;
providing a source of HEF;
providing at least one pre-mixing chamber having a first and a second inlet and a first and a second outlet;
injecting working fluid into the at least one pre-mixing chamber via a first inlet;
injecting HEF into the at least one pre-mixing chamber via a second inlet, wherein the at least one pre-mixing chamber, the first inlet and the second inlet are arranged so that the working fluid and the HEF flow in opposite directions within the at least one pre-mixing chamber;
injecting the working fluid from the at least one pre-mixing chamber into the expansion chamber via at least one outlet; and
removing at least a portion of the HEF from the premixing chamber after heat has been removed therefrom.

8. The method of claim 7, including the step of causing the working fluid and HEF to move in opposite clockwise or counter-clockwise directions within the pre-mixing chamber.

9. A method of operating the pre-mixing system of claim 1 comprising the steps of:
a) Opening said first inlet valve and introducing a quantity of heat exchange fluid into said chamber;
b) Opening said second inlet valve and introducing a quantity of liquid cryogen into said chamber;
c) Causing said heat exchange fluid and said liquid cryogen to mix and allowing said heat exchange fluid to pass heat to said cryogenic;
d) Opening said first outlet valve and causing cryogenic fluid to pass into an expansion chamber; and e) Opening said second outlet valve and causing any remaining heat exchange fluid to escape from said pre-mixing chamber.

10. A method as claimed in claim 9, including the step of providing the heat exchange fluid in the form of a low compressibility fluid.

11. The system of claim 2, wherein the at least one pre-mixing chamber is substantially cylindrical.

12. The system of claim 2, wherein the at least one pre-mixing chamber, the first inlet and the second inlet are arranged so that one of the working fluid and the HEF flows in a clockwise direction within the at least one pre-mixing chamber, and the other of the working fluid and the HEF flows in an anti-clockwise direction within the at least one pre-mixing chamber.

13. The system of claim 2, further comprising a plurality of pre-mixing chambers each having its own respective first inlet, second inlet and at least one outlet.

14. The system of claim 2, wherein the at least one pre-mixing chamber is mounted on the expansion chamber, and wherein the at least one outlet comprises a rotating valve.

15. The system of claim 4, further comprising a plurality of pre-mixing chambers each having its own respective first inlet, second inlet and at least one outlet.

16. The system of claim 4, wherein the at least one pre-mixing chamber is mounted on the expansion chamber, and wherein the at least one outlet comprises a rotating valve.

17. The system of claim 5, wherein the at least one pre-mixing chamber is mounted on the expansion chamber, and wherein the at least one outlet comprises a rotating valve.

18. The system of claim 12, further comprising a plurality of pre-mixing chambers each having its own respective first inlet, second inlet and at least one outlet.

19. The system of claim 12, wherein the at least one pre-mixing chamber is mounted on the expansion chamber, and wherein the at least one outlet comprises a rotating valve.

20. The system of claim 18, wherein the at least one pre-mixing chamber is mounted on the expansion chamber, and wherein the at least one outlet comprises a rotating valve.

* * * * *